(12) United States Patent  
Rossignol et al.

(10) Patent No.: US 12,077,263 B2  
(45) Date of Patent: Sep. 3, 2024

(54) FRAMEWORK FOR CONTROLLING DEVICES

(71) Applicant: TidalX AI Inc., San Ramon, CA (US)

(72) Inventors: Andrew Rossignol, Mountain View, CA (US); Ryan Heacock, Cupertino, CA (US); Nupur Garg, Cupertino, CA (US); Barnaby John James, Campbell, CA (US)

(73) Assignee: TidalX AI Inc., San Ramon, CA (US)

( * ) Notice: Subject to any disclaimer, the term of this patent is extended or adjusted under 35 U.S.C. 154(b) by 330 days.

(21) Appl. No.: 17/347,452

(22) Filed: Jun. 14, 2021

(65) Prior Publication Data

US 2022/0396339 A1    Dec. 15, 2022

(51) Int. Cl.
| | |
|---|---|
| *B63B 45/00* | (2006.01) |
| *A01K 61/95* | (2017.01) |
| *B63B 79/10* | (2020.01) |
| *G05B 13/02* | (2006.01) |

(52) U.S. Cl.
CPC .............. *B63B 45/00* (2013.01); *A01K 61/95* (2017.01); *B63B 79/10* (2020.01); *G05B 13/028* (2013.01)

(58) Field of Classification Search
None
See application file for complete search history.

(56) References Cited

U.S. PATENT DOCUMENTS

| | | |
|---|---|---|
| 10,856,520 B1 | 12/2020 | Kozachenok et al. |
| 10,863,727 B2 | 12/2020 | Jans |
| 2013/0273599 A1 | 10/2013 | Robitaille |
| 2013/0284105 A1* | 10/2013 | Han ............ A01K 61/60 119/230 |
| 2015/0136037 A1 | 5/2015 | Boonekamp |

(Continued)

FOREIGN PATENT DOCUMENTS

| | | |
|---|---|---|
| CL | 2019000039 A1 | 3/2019 |
| CN | 108040948 | 5/2018 |

(Continued)

OTHER PUBLICATIONS

Extended Search Report in European Appln. No. 22151132.2, dated May 2, 2022, 10 pages.

(Continued)

*Primary Examiner* — Aniss Chad
*Assistant Examiner* — Jennifer M Anda
(74) *Attorney, Agent, or Firm* — Fish & Richardson P.C.

(57) ABSTRACT

Methods, systems, and apparatus, including computer programs encoded on a computer storage medium, that control devices in an aquaculture environment. One of the methods includes determining a particular objective for a robot that is operating in an aquaculture environment and determining one or more sensed conditions that are associated with the aquaculture environment. The particular objective is provided to an anti-fish-startling model evaluation engine that is configured to output actions, for a given objective, that accomplish the given objective while reducing a startling effect on nearby fish. Based on providing the particular objective to the anti-fish-startling model evaluation engine, one or more particular actions for accomplishing the particular objective are determined. The one or more particular actions are transmitted to another device.

20 Claims, 6 Drawing Sheets

(56) References Cited

U.S. PATENT DOCUMENTS

| | | | |
|---|---|---|---|
| 2017/0150701 | A1 | 6/2017 | Gilmore et al. |
| 2018/0000055 | A1 | 1/2018 | Tanase |
| 2018/0027637 | A1 | 1/2018 | Kurt |
| 2019/0228218 | A1 | 7/2019 | James et al. |
| 2019/0340440 | A1 | 11/2019 | Atwater et al. |
| 2019/0363791 | A1 | 11/2019 | Teo |
| 2020/0107524 | A1 | 4/2020 | Messana et al. |
| 2020/0113158 | A1 | 4/2020 | Rishi |
| 2020/0155882 | A1 | 5/2020 | Tohidi et al. |
| 2020/0288678 | A1 | 9/2020 | Howe et al. |
| 2020/0288679 | A1 | 9/2020 | Howe |
| 2020/0288680 | A1 | 9/2020 | Howe |
| 2021/0064034 | A1* | 3/2021 | Ouyang ............ G05B 13/0265 |
| 2021/0080715 | A1 | 3/2021 | Saxena |
| 2021/0142052 | A1 | 5/2021 | James |
| 2021/0329891 | A1* | 10/2021 | Kozachenok .......... A01K 61/95 |
| 2021/0329892 | A1* | 10/2021 | Kozachenok .......... A01K 61/95 |

FOREIGN PATENT DOCUMENTS

| | | |
|---|---|---|
| EP | 2244934 | 11/2010 |
| EP | 2962556 | 1/2016 |
| EP | 3484283 | 5/2019 |
| GB | 2539495 | 12/2016 |
| JP | 2002171853 | 6/2002 |
| NO | 300401 | 5/1997 |
| NO | 20160199 | 8/2017 |
| WO | WO 1990/007874 | 7/1990 |
| WO | WO 1997/019587 | 6/1997 |
| WO | WO 2009/008733 | 1/2009 |
| WO | WO 2009/097057 | 8/2009 |
| WO | WO2012081990 | 6/2012 |
| WO | WO 2014/179482 | 11/2014 |
| WO | WO2017137896 | 8/2017 |
| WO | WO 2018011744 | 1/2018 |
| WO | WO2018011745 | 1/2018 |
| WO | WO 2019/002881 | 1/2019 |
| WO | WO 2019/121851 | 6/2019 |
| WO | WO 2019/121900 | 6/2019 |
| WO | WO 2019/188506 | 10/2019 |
| WO | WO 2019/232247 | 12/2019 |
| WO | WO 2020/046524 | 3/2020 |
| WO | WO 2020/132031 | 6/2020 |
| WO | WO 2020/180188 | 9/2020 |
| WO | WO 2021/006744 | 1/2021 |
| WO | WO 2021/030237 | 2/2021 |
| WO | WO 2022/010815 | 1/2022 |
| WO | WO 2020/072438 | 4/2022 |

OTHER PUBLICATIONS

International Preliminary Report on Patentability in International Appln. No. PCT/US2020/059829, dated May 27, 2022, 11 pages.
International Search Report and Written Opinion in International Appln. No. PCT/US2020/059829, dated Feb. 25, 2021, 18 pages.
International Search Report and Written Opinion in International Appln. No. PCT/US2022/022492, dated Jun. 28, 2022, 13 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Qiu et al., "Improving Transfer Learning and Squeeze-and-Excitation Networks for Small-Scale Fine-Grained Fish Image Classification," IEEE Access, Dec. 2018, 6(31):78503-78512.
Stein et al., "Consistent melanophore spot patterns allow long-term individual recognition of Atlantic salmon *Salmo salar*," Journal of Fish Biology, Nov. 2017, 91(6):1699-1712.
Davis et al., "Fish stress and mortality can be predicted using reflex impairment," Fish and Fisheries, Mar. 2010, 11(1):1-11.
Heinen et al., "Light Control for Fish Tanks," The Progressive Fish-Culturist, Feb. 1998, 60(4), 9 pages.
Kastelein et al., "Startle response of captive North Sea fish species to underwater tones between 0.1 and 64kHz," Marine Environmental Research, Jan. 2008, 65(5):369-377.
Kirshenbaum et al., "Startle, pre-pulse sensitization, and habituation in zebrafish," Journal of Neuroscience Methods, Feb. 2019, 313:54-59.
Königson et al., "Reactions in individual fish to strobe light. Field and aquarium experiments performed on whitefish (*Coregonus lavaretus*), " Hydrobiologia, Sep. 2002, 483(1):39-44.
Michel et al., "A remote monitoring system for Open Ocean Aquaculture," Oceans '02 MTS/IEEE, Oct. 2002, 9 pages.
PCT International Search Report and Written Opinion in International Appln. No. PCT/US2021/023104, dated Jun. 18, 2021, 13 pages.
International Search Report and Written Opinion in International Appln No. PCT/US2022/018651, dated Jun. 22, 2022, 14 pages.
International Search Report and Written Opinion in International Appln No. PCT/US2022/021683, dated Jun. 27, 2022, 14 pages.
International Search Report and Written Opinion in International Appln No. PCT/US2022/022250, dated Jul. 6, 2022, 15 pages.
International Search Report and Written Opinion in International Appln No. PCT/US2022/022589, dated Jul. 7, 2022, 12 pages.
International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
Maloy et al., "A spatio-temporal recurrent network for salmon feeding action recognition from underwater videos in aquaculture," Computers and Electronics in Agriculture, Nov. 12, 2019, 9 pages.
Odey, "AquaMesh—Design and Implementation of Smart Wireless Mesh Sensor Networks for Aquaculture," American Journal of Networks and Communications, Jul. 2013, 8 pages.
Petrov et al., "Overview of the application of computer vision technology in fish farming," E3S Web of Conferences, 2020, 175:02015.
Saberloon et al., "Application of Machine Vision Systems in Aquaculture with Emphasis on Fish: State-of-the-Art and Key Issues," Reviews in Aquaculture, Dec. 2017, 9:369-387.
Towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Wang, "Robust tracking of fish schools using CNN for head identification," Multimedia Tools and Applications, Nov. 2017, 20 pages.
International Preliminary Report on Patentability in International Appln. No. PCT/US2022/022492, dated Dec. 28, 2023, 8 pages.

* cited by examiner

FRAMEWORK FOR CONTROLLING DEVICES

TECHNICAL FIELD

This specification relates to controllers, and one particular implementation describes a framework for controlling illumination devices in an aquaculture environment.

BACKGROUND

Illumination devices can be used in aquaculture environments or agriculture environments to monitor organisms that are being cultivated. For example, an illumination device might illuminate a farmed fish so that an imaging device might generate an image of the illuminated fish. Such images can be used to estimate the size of the biomass or the health of a farmed fish, for example to detect the presence of ectoparasites such as sea lice. In another example, illumination and imaging devices can be used to monitor feeding behavior of animals such as horses.

In some circumstances, introducing or operating devices can startle the organisms that are being cultivated. For example, in an aquaculture environment, under some conditions, introducing a new device without first acclimating the fish to the device, or activating an illumination device quickly, can startle organisms in the environment. Such rapid introduction can cause the fish to collide with underwater structures while fleeing, potentially harming the health of the fish. In another example, in an agriculture environment, sudden movements of devices in proximity to animals such as horses or cattle can startle the animals, potentially causing harm to the animal or other nearby animals or humans. When startled, for instance, a horse might rear up or kick back, potentially injuring the horse or other animals, humans or equipment that are nearby.

SUMMARY

This specification describes a framework for controlling devices, including illumination devices, in an aquaculture or agriculture environment. More specifically, this specification describes a framework that uses an anti-fish-startling model evaluation engine to constrain abrupt actions of devices that are present in an aquaculture environment. The constrained actions can include reducing the speed with which underwater illumination devices are turned on or off, slowing the motion of underwater devices, or delaying, reducing or eliminating operations that can produce noises that may startle fish.

Particular embodiments of the subject matter described in this specification can be implemented so as to realize one or more of the following advantages. The techniques described below permit the operation of devices in an aquaculture environment while limiting the impact to fish health for example, by reducing the likelihood that fish, once startled, collide with underwater structures or with other fish. The techniques described below can also permit the devices to be operation while limiting the impact to human health. Additionally, the techniques describe below can achieve various fish-monitoring objectives while limiting the impact to nearby equipment and organisms.

One aspect features determining a particular objective for a robot that is operating in an aquaculture environment and determining one or more sensed conditions that are associated with the aquaculture environment. The particular objective is provided to an anti-fish-startling model evaluation engine that is configured to output actions, for a given objective, that accomplish the given objective while reducing a startling effect on nearby fish. Based on providing the particular objective to the anti-fish-startling model evaluation engine, one or more particular actions for accomplishing the particular objective are determined. The one or more particular actions are transmitted to another device.

One or more of the following features can be included. The particular objective can be illuminating an illumination device or moving a robot. The action can be illuminating an illumination device over a configured period of time. The anti-fish-startling model evaluation engine can evaluates machine learning model. Determining the one or more particular actions can includes evaluating one or more rules. The objective can be introducing a device into the environment.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
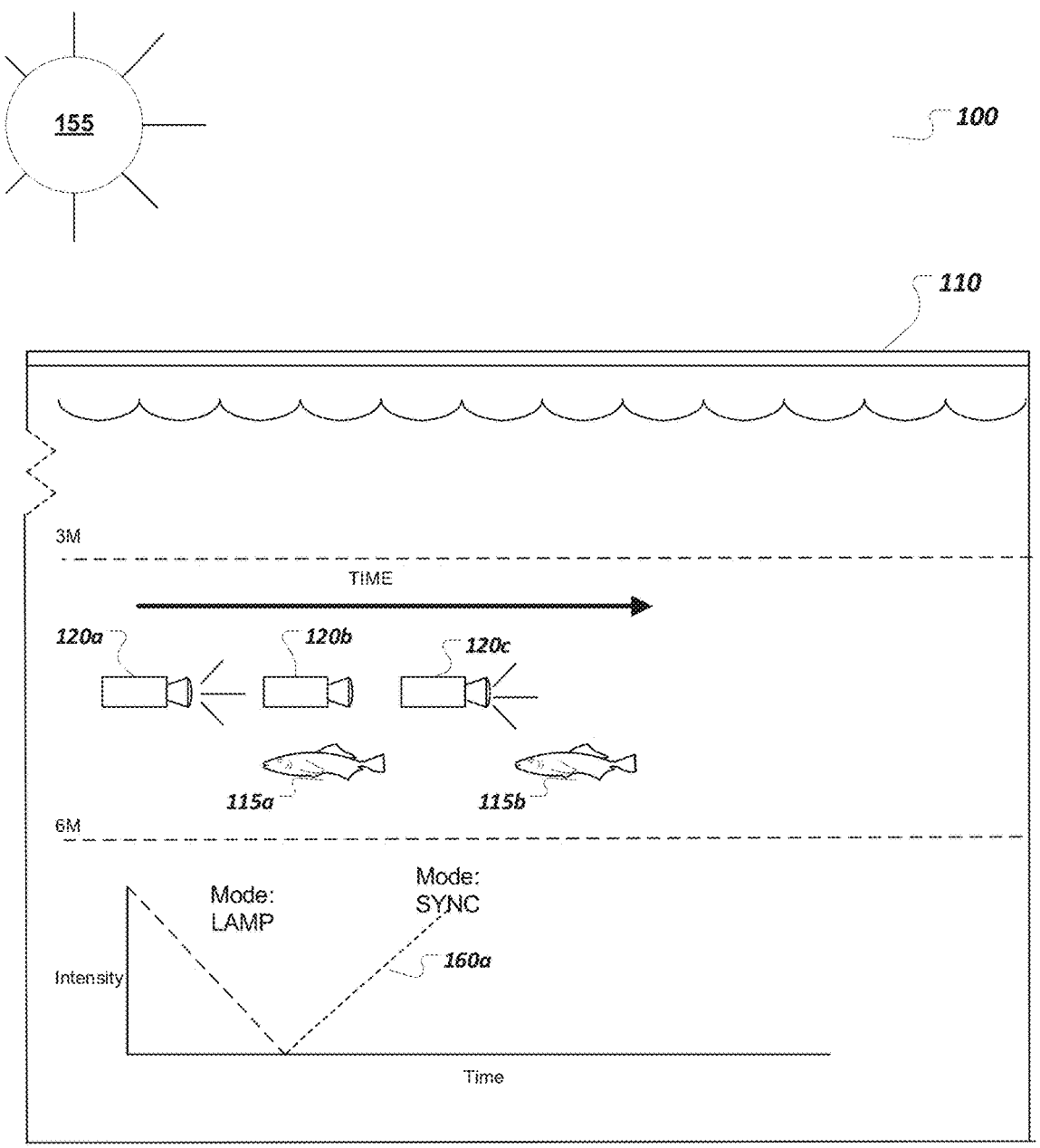
FIGS. 1A-1D are illustration of a framework for controlling devices.

FIGS. 1A-1D are illustrations of a framework for controlling devices, such as devices present in an aquaculture environment. Aquaculture includes the farming of marine organisms such as fish, crustaceans and mollusks. Aquaculture is important to the health of marine ecosystems, which can suffer from overharvesting. Some reports have indicated that over half of all fish and shellfish come from aquaculture, and in the absence of aquaculture, substantial, and perhaps irreversible, strain on marine ecosystems could result.

Various devices, such as illumination and imaging devices are used to monitor and manage aquaculture environment. For example, one challenge that exists in aquaculture is parasites, such as sea lice, which can cause skin erosion and hemorrhaging, gill congestion, and increased mucus production. Parasites harm both the welfare of the organisms being farmed, and also the yield produced by an aquaculture environment. Illumination and imagine devices can be used to generate images that can be delivered to parasite-detection system, enabling detection and remediation of parasitic infestations.

In another example, illumination and imaging devices are used to estimate the biomass of a population of fish within an aquaculture environment. The fish can be illuminated, and a camera can take images that are subsequently used to estimate their biomass. Understanding the biomass of the population of fish can enable the proper management of the environment, including harvesting and feeding decisions, e.g. when to start or stop a feeding device.

Because devices can serve multiple purposes, some devices can operate in different modes. For example, an illumination device can operate in "lamp mode," where it provides a constant level of illumination in the environment, and in "sync mode," where it emits pulses of light that are timed to coincide with image capture by an imaging device.

However, certain device actions, such as quick motions or illumination changes, such as might occur when an illumination device changes its mode of operation, can startle fish in the aquaculture environment. When a fish is startled, it can move in a way that causes harm to itself or to other fish, for example, by colliding with an underwater structure or with other fish. Further, device actions that can cause harm can differ depending on environmental conditions. For example, rapidly illuminating a light in bright conditions, such as in shallow water during daylight, might not be perceptible to a fish, but rapidly illuminating a light in dark conditions, such as at night or in deep water, can startle a fish. In another example, certain motions of an illumination device will startle fish that have not been acclimated to the device, but are less likely to startle the fish after the fish have been acclimated to the device.

However, simply illuminating lights slowly at all times, or moving devices at a low rate of speed is also undesirable. For example, illuminating a light more slowly than is necessary to protect fish health can result in an inability to capture images useful in managing the environment, such as detecting sea lice. Similarly, relocating devices at some low maximum speed can result in the devices being improperly positioned, which can cause lost opportunities for data collection, or can require an excessive period of time to remove a device for maintenance.

Thus, to reduce the likelihood that fish are startled while still collecting necessary data, it is important to monitor environmental conditions, such as daylight, and manage aquaculture devices accordingly.

In FIG. 1A, the framework for controlling devices is illustrated for three scenarios, A-C, each illustrating a device at a different depth.

In FIG. 1A, a device 120a, 120b, 120c, which in this example is an illumination device that can provide light within an environment 110, is shown at three different times. The environment 110 is being illuminated by the sun 155, which is providing ambient light. The device 120a, 120b, 120c is connected to a pulley system that allows the device to be moved within the environment.

As illustrated in the graph 160a, the objective for the device is to transition states from "LAMP" mode, in which the device is providing general illumination, to "SYNC" mode, where the device is being used in the synchronized operation of light and camera. To transition from LAMP mode to SYNC mode, the level of illumination is typically brought down to a baseline level, then increased to the intensity required for SYNC mode operation. The transition is illustrated by the device 120a at a first time providing illumination, the device 120b at a second time providing no illumination, and the device 120c at a third time again providing illumination.

Absent an anti-fish-startling model evaluation engine, the device could be transitioned quickly—that is, brought down to a baseline level, then increased in intensity—without regard to fish health. In contrast, an anti-fish-startling model evaluation engine can consider the impact to fish health, for example, by reducing the likelihood of startling, while determining actions for a device, such as device 120a.

Since the device 120a is at an intermediate depth, for example between 3 meters and 6 meters, and light from the sun 155 is illuminating the environment 110, an anti-fish-startling model evaluation engine can determine that the level of ambient light at that depth of the environment 110 is sufficient to permit, without startling the fish 115a, 115b, the device 120a to reduce the level of light and restore it quickly, as illustrated in the graph 160a. Note that, while the light reduction and restoration rates are as illustrated as being linear—that is, light is reduced and restored at constant levels—an anti-fish-startling model evaluation engine can use other approaches, such as changes the light level according to a logarithmic function.

Figure 1B:
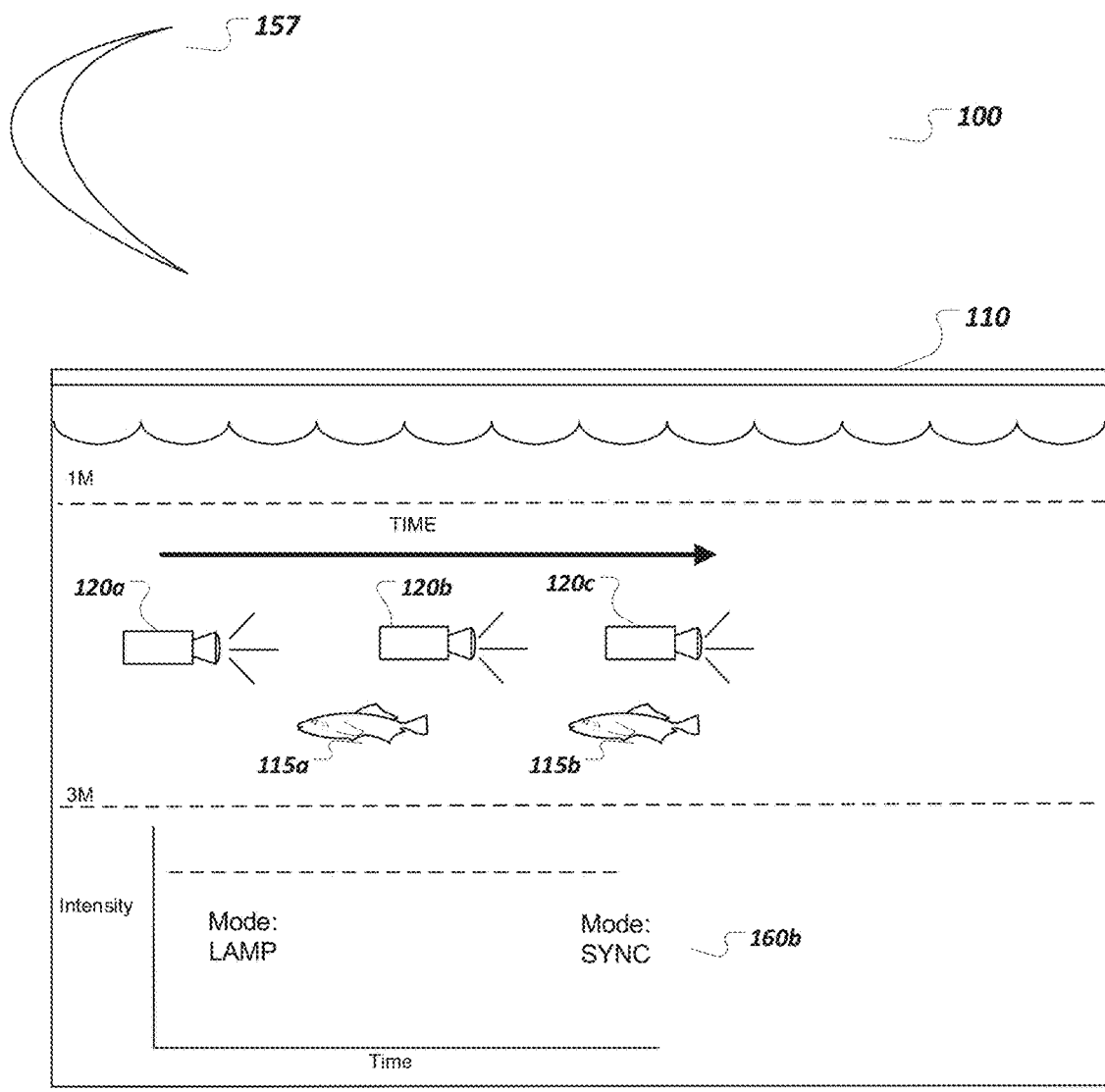

In FIG. 1B, the device 120b is again in an aquaculture environment 110 and is transitioning from LAMP mode to SYNC mode, but in this illustration, the device 120b is in shallower the water, e.g., between 1 and 3 meters deep, and the environment is illuminated by light reflecting off the moon 157. An anti-fish-startling model evaluation engine can determine that, to limit the risk of startling the fish, the intensity of light should be maintained at a constant level, as shown in the graph 160b, and is further illustrated by device 120a at a first time providing illumination, the device 120b at a second time providing also providing illumination, and the device 120c at a third time still providing illumination.

Figure 1C:
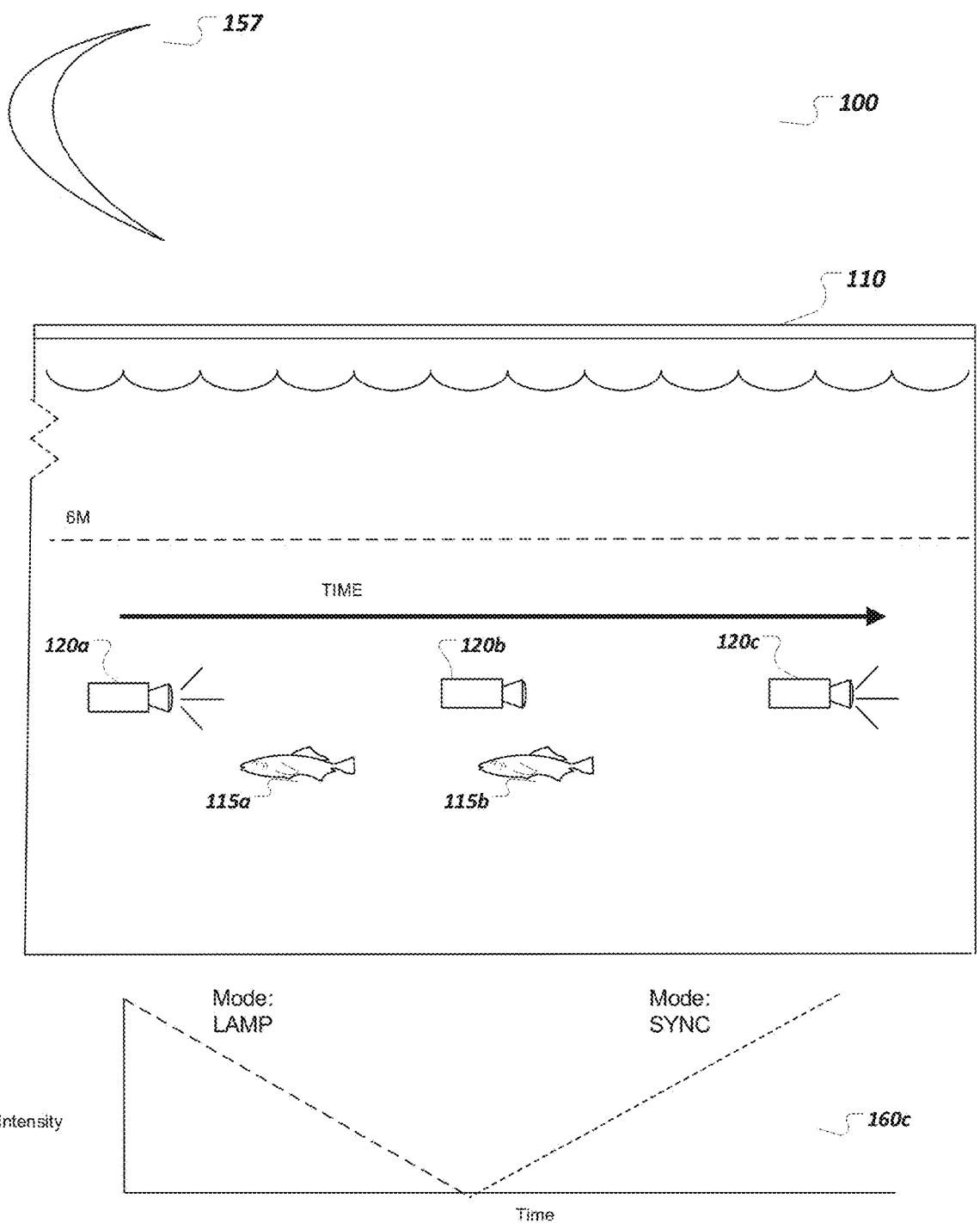

In FIG. 1C, the device 120c is again in an aquaculture environment 110 and is transitioning from LAMP mode to SYNC mode. In this illustration, the device 120c is in still deeper water, e.g., below 6 meters, and the environment is again illuminated by the light reflecting off the moon 157. An anti-fish-startling model evaluation engine can determine that, since the device is in deep water, the level of ambient light is too low to support rapid reducing and increasing of light. Instead, an anti-fish-startling model evaluation engine can determine that, to reduce the likelihood that fish are startled, the level of light should be reduced and increased slowly, as illustrated in the graph 160c. This slow transition is further illustrated by the device 120a at a first time providing illumination, the device 120b at a second time providing no illumination, and the device 120c at a third time again providing illumination.

Figure 1D:
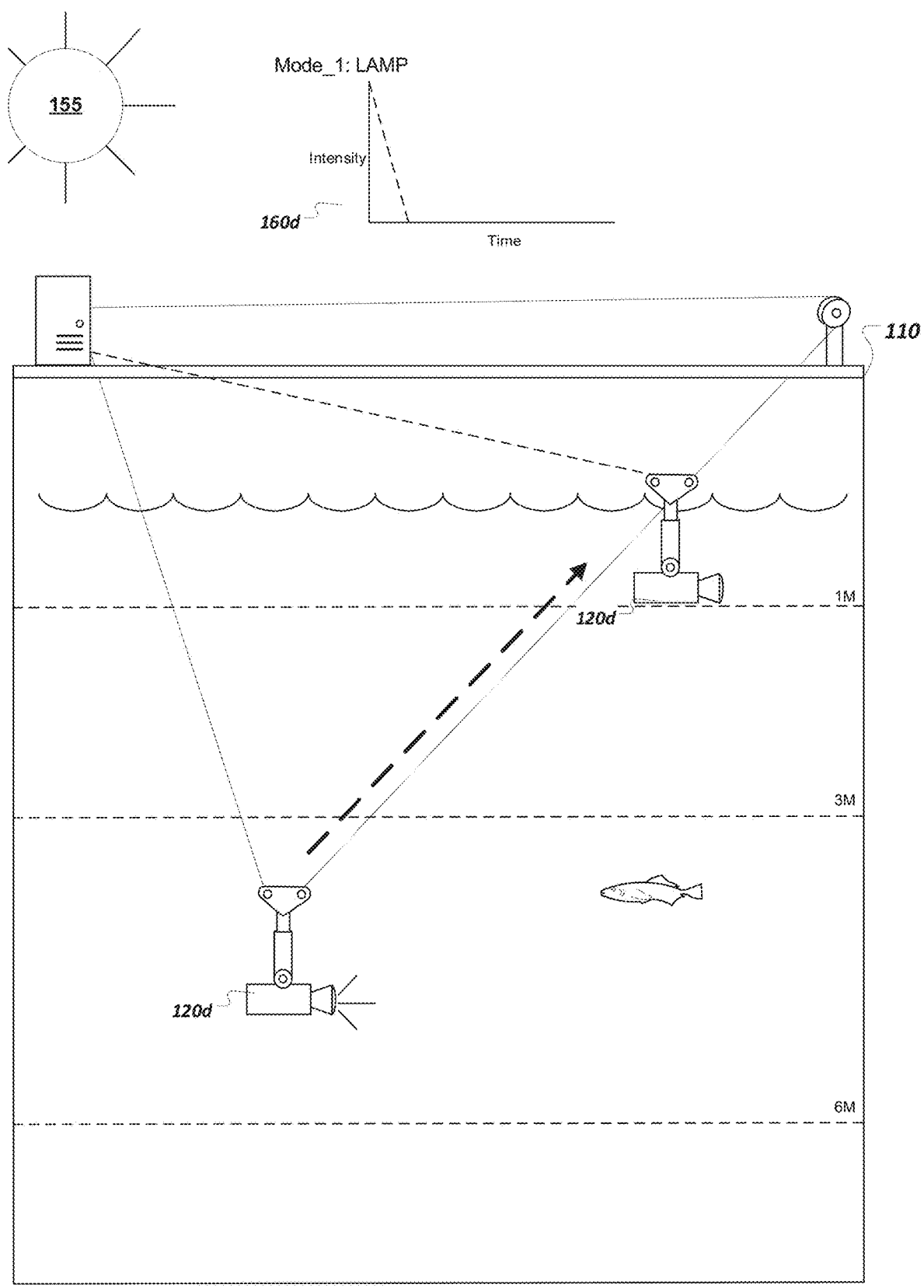

In FIG. 1D, the objective of device 120d is to surface quickly, for example, to protect it from potential damage. If the device 120d surfaces at full illumination intensity, the illumination produced by the device 120d can cause harm to humans. As a result, an anti-fish-startling model evaluation engine can determine that the light should be reduced rapidly, as shown in graph 160d. While a rapid decrease in light can startle fish, an anti-fish-startling model evaluation engine can take this action to protect human health.

Figure 2:
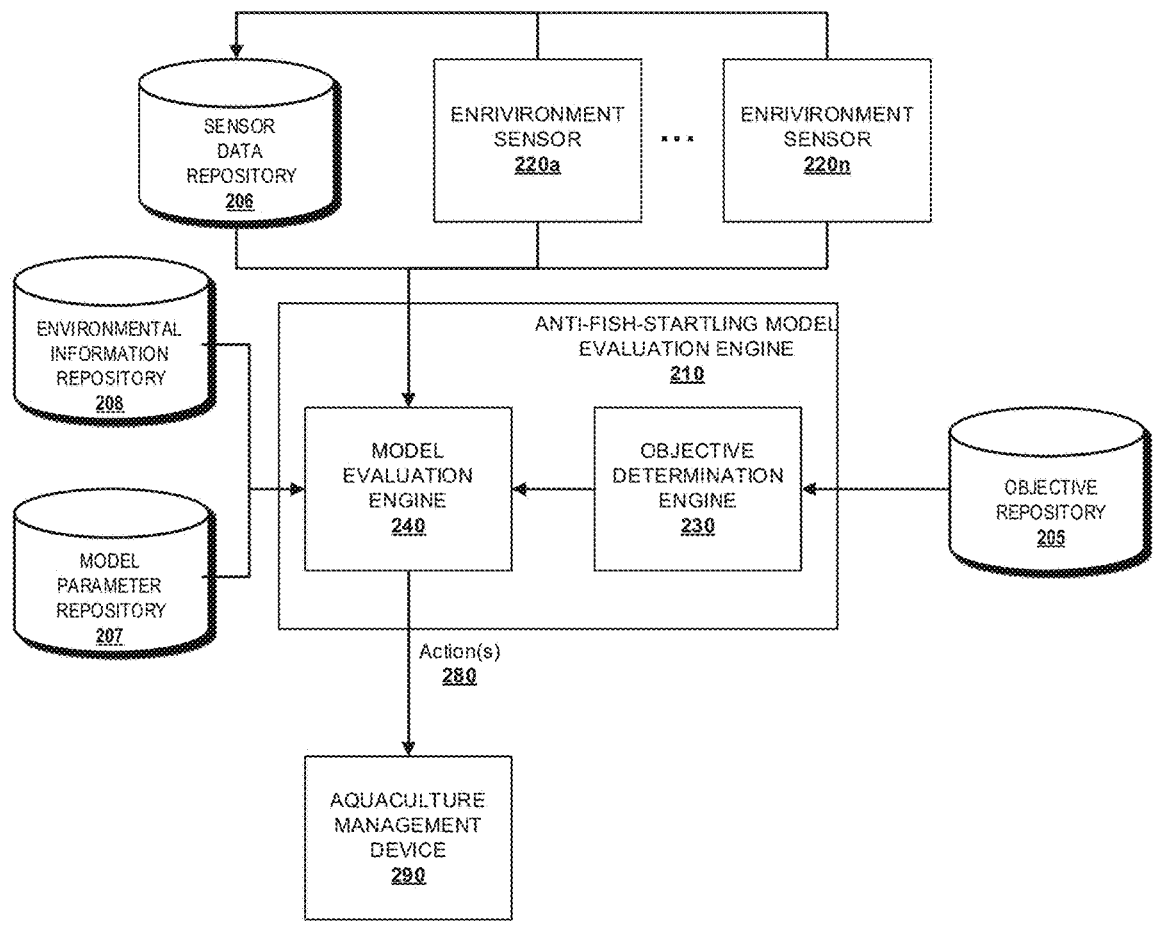
FIG. 2 is a block diagram of an example system for controlling devices.

FIG. 2 is a block diagram of an example system for controlling devices. The system can include an anti-fish-startling model evaluation engine 210, an objective repository 205, a sensor data repository 206, one or more sensors 220a-220n, a model parameter repository 207 and an environmental information repository 208.

The objective repository 205 can contain objectives for the framework. For example, an objective can specify that an illumination device should provide, at a given location, a level of illumination at a particular time and for a particular duration. Another objective can specify that a new device be added to the environment.

A "repository," as used in this specification, can refer to any appropriate type of logical or physical data storage within which data can be stored. For example, a repository can be implemented using a file system in which data are stored in files, and data can be stored and retrieved using file system operations. A file system can be stored on one computer system, or on multiple computer systems connected by a network. In another implementation, a repository can be a database, such as a relational database, and data are stored and retrieved using database operations, for example, expressed as structured query language (SQL)

commands. A database can be stored on one computer system, or on multiple computer systems connected by a network. A repository can be stored on the same computer as the system, or it can be stored on a different computer. Further, a repository can include multiple data storage units. For example, data associated with one repository might exist in multiple relational databases each stored on a different computers. Alternatively, a repository can include both relational database tables and files in a file system. In addition, a repository can refer to one or more areas of computer memory, such as random access memory (RAM), present in one or more computer systems. A repository in this specification an also refer to combinations of all such implementations listed above and/or to other data storage techniques alone or in combination.

Sensors 220a-220n can take measurements of conditions in an aquaculture environment. For example, a depth sensor can determine a device's current depth and a light sensor can determine the level of ambient light at a particular location. Sensors can transmit their measurements to the model evaluation engine 240 that can be included in the anti-fish-startling model evaluation engine 210 and to the sensor data repository 206.

The sensor data repository 206 can contain information that configures the operation of a sensor, e.g., 220a. For example, the sensor data repository 206 can include a schedule on which one or more sensors should report measurements. In another example, the sensor data repository 206 can include information relating to how measurement are taken, for example, for how long a light sensor should measure light before determining the current light intensity.

The environmental information repository 208 can contain data related to the aquaculture environment. For example, the environmental information repository 208 can contain the time and light intensity of civil twilight, astronomical twilight and/or night for a particular location and on a particular date.

Figure 3:
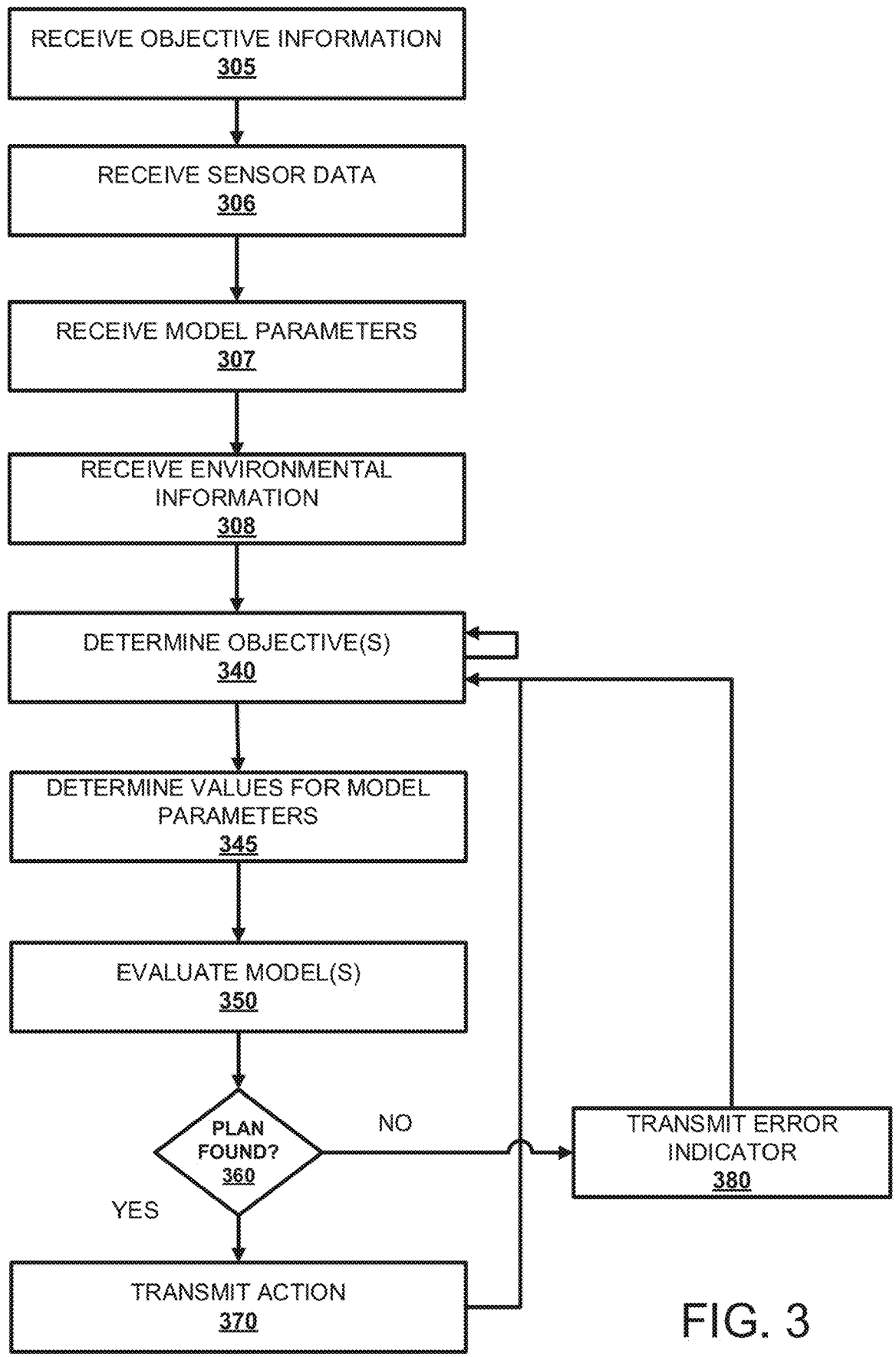
FIG. 3 is a flow diagram of an example process to control devices.

The model parameter repository 207 can contain information used to configure the evaluation of one or more anti-fish-startling models, as described in reference to FIG. 3.

The anti-fish-startling model evaluation engine 210 can include an objective determination engine 230 and a model evaluation engine 240, and can receive data from one or more of the repositories described above and directly from sensors 220a-220n. The anti-fish-startling model evaluation engine 210 can produce, for a given objective, one or more recommended actions 280 that guide the behavior of an aquaculture management device 290 while minimizing the impact to organisms in the aquaculture environment.

The objective determination engine 230 can determine an objective for a device. An objective can define the intended behavior of a device. For example, an objective for an illumination device might be to provide a certain intensity of light of a given frequency at a given time and for a given duration. Objectives can be expressed in various forms such as XML (Extensible Markup Language). For example, an objective might have outer tags such as <Objective> . . . </Objective> with inner tags such as <DeviceType> . . . </DeviceType> to identify the type of device to which the objective applies, <StartTime> . . . </StartTime> to define when the device should start performing the objective, and so on. The objective can also reflect the amount of time a device has been present in the environment. For example, an objective such as "travel at a rate no faster than 0.1 kilometers per hour" can be active only for the first two days a device is present in an environment. The objective determination engine 230 can transmit one or more objectives to the model evaluation engine 240.

The model evaluation engine 240 can be responsible for determining actions that achieve the objective, that is, those received from the objective determination engine, for a device, while minimizing impact, such as startling, to organisms in the aquaculture environment.

The model evaluation engine 240 can receive sensor data from sensors 220a-220n, model parameters from the model parameter repository 207, environmental information from the environmental information repository 208, and an objective from the objective determination engine 230. The model evaluation engine 240 can produce one or more recommended actions 280 that guide the behavior of an aquaculture management device 290, such as an illumination device or an imaging device. The model evaluation engine 240 can evaluate rules, evaluate one or more machine learning models, or use a combination of rules and machine learning models, as described further in reference to FIG. 3.

FIG. 3 is a flow diagram of an example process to control devices. For convenience, the process will be described as being performed by a system of one or more computers located in one or more locations. For example, a system for controlling devices, e.g., the system for controlling devices 200 of FIG. 2, appropriately programmed in accordance with this specification, can perform the process.

In operation 305, the system retrieves objective information. In this specification, data can be retrieved from a repository using operations associated with the repository, and the operations used can depend on the type of repository. For example, if the repository is a relational database, data can be retrieved using SQL (structured query language) operations. If the repository is a file system, data can be retrieved using file system operations, such as operations to open a file, read data close the file. If the repository is stored in memory, then the operations can be memory access operations.

Objective information can describe the objective(s) for one or more devices at one or more times. An instance of objective information can include: (i) the type of objective, such as "reset" or "surface"; (ii) a schedule; (iii) a location; (iv) additional information such as an identifier for the objective.

Objective can describe desired actions for one or more devices. For example the reset objective can indicate that an illumination device should be turned off, then turned back on. The reset action can be associated with a state transition, for example, when the device transitions from being used in "lamp mode" to "sync mode." A "surface" objective can indicate that the illumination device is to be brought to the surface rapidly.

A schedule can be any specification of time or order, such as 4 pm (local time) today, 4 pm every day, 4 pm every other day, every 2 hours beginning at 1am, at the same time as the objective with identifier "Objective_1," and so on. Some implementations can also use negative specifications, such as "not any day at 1am" or "not when Objective_1 is active." Objective information can also include a priority indicator that indicates the relative importance of an objective instance, or of a class of objective instances.

In operation 306, the system retrieves sensor data. Sensor data can be retrieved using the methods described above.

Sensor data can include any measurement of the environment such as the current light intensity at sea level, the current light intensity at a particular depth, the current light intensity at a particular depth and location, current temperature at a particular depth and or location, measurements of current speeds at a given depth and/or location, the time of day, and so on. Sensor data can also include historical values of the measurement data (and other sensor data) listed above.

In operation 307, the system retrieves model parameters. Model parameters can be retrieved using the methods described above.

Model parameters can be used to configure the evaluation of the model, as described further in reference to operation 350. For example, a model parameter might indicate that, at a given depth and during daylight hours, the intensity illumination can be increased rapidly, and that between at a given depth and during nighttime hours, the intensity illumination must be increased slowly. The model parameters can also indicate that no change in illumination is permitted, using a token such as "steady." The model parameters can also define "slow", "rapid" and "off." For example, "slow" can be defined as actions that include a steady decrease in illumination until it reaches a minimum value then a steady increase in illumination intensity such that the intensity reaches the desired value after a configured duration, such after 30 minutes. "Rapid" can be defined as a steady decrease in illumination until it reaches zero followed by a steady increase in illumination intensity such that the intensity reaches the desired value within a configured period of time, such as 1 minute. The system can also define "off" to mean a rapid decrease in illumination until it reaches zero.

In operation 308, the system retrieves environmental information. Environmental information data can be retrieved using the methods described above.

Environmental information data can include data pertaining to environmental conditions in the vicinity of the aquaculture environment. For example, environmental information data can include the start time of sunrise, civil twilight and sunset for each date of the year. Environmental data can also include the depth beyond which the illumination level from ambient light never exceeds a configured threshold.

While operations 305-308 are depicted as being performed in order, the system can perform the operations in any order, or at the same time.

In operation 340, the system determines one or more objectives to activate for one or more devices by evaluating the objective information received in operation 305. In some implementations, the system can evaluate each instance of objective information to determine whether the objective specified by the instance should be active at the current time. For example, the system can evaluate the schedule portion of the instance to determine whether the instance should be active. For example, if the instance has a schedule that specifies that an objective should be active at 1 pm (local time) each day, and it is presently 1 pm, the system can determine that the objective should be active. In cases where multiple objective instances are relevant at a given time, and are in opposition (e.g., "turn light on" and "turn light off"), the system can use the priority of the instances to determine which of the objectives should be active.

If the system determines that at least one objective should be active, the system proceeds to operation 345; if the system determines that no objectives should be active, the system can pause for a configured period of time then re-execute operation 340.

In operation 345, the system determines values for one or more model parameters. In some implementations, the model parameters can specify a device behavior that is associated with one or more of: (i) time in the environment, (ii) level ambient illumination, (iii) depth and (iv) objective.

The system can determine the amount of time the device has been in the environment from, for example, sensor data associated with the device or from a management system associated with the device.

The system can determine level or category of ambient illumination using the environmental information and sensor data. For example, environmental information can include, for each day of the year, the times during which it is daylight and the times during which it is night. The system can use the time of day to determine whether the ambient level of light is associated with daylight or with night and assign a correspond category of ambient light, such as "daylight" or "night." In another implementation, the level of natural illumination can be measured by a sensor configured to measure light at a location at which an action will occur, and use that measurement, together with configured thresholds for daylight and night to assign a category to the measured value of ambient light.

The system can determine depth from sensor data provided by a sensor configured to determine depth. The system can categorize depth into depth specified in the environmental data. For example, the system can categorize the depths as "shallow," "medium", "deep" and "floor" for depths of under 1 meter, 1 meter to 3 meters, 3 to 6 meters, and beyond 6 meters, respectively.

In some implementations, the model parameters can be trained parameters for a machine learning model. The parameters can be trained using training data that can include an indication of the amount of time a device has been in the environment, the amount of ambient light, a measurement of the depth, an indication of the action performed, and an indication as to whether the fish were startled when the action had been performed previously. Note that, for an action that requires an illumination device to surface, although the fish might be startled, the model parameters can be trained such that the model, when executed, permits this action since the action is taken to protect human health.

Once the system has determined the data values associated with the model parameters, as described above, in operation 350, the system can evaluate one or more models to determine a plan for achieving the objective while ensuring that the predicted level of startling remains below a configured threshold. The plan can include the objective(s) and the device behavior(s) that occurs during the time the objective is being executed. The anti-fish-startling model evaluation can be implemented using one or more rule-based technique, one or more machine learning models, or other model evaluation techniques.

When the anti-fish-startling model evaluation uses a rule-based technique, the system can construct a data structure that defines, for some combinations of the model parameters, such as ambient light categories, depth categories and objectives, a plan that includes an action. The actions can include "rapid_recycle" the lighting—i.e., turning the light off then back on quickly—"surface"—i.e., bringing the illumination device rapidly to the surface, or "introduce"—i.e., introduce a new device into the environment. The system can also permit entries in the data structure that include wildcard characters, such as "*" which can match any value. For example, the data structure might include the data in the table below:

{{daylight, shallow, recycle}, {rapid_recycle, recycle}}
{{*, medium, recycle}, {steady_recycle, recycle}}

```
{{daylight, deep, recycle}, {rapid_recycle, recycle}}
{{*, floor, recycle}, {slow_recycle, recycle}}
{{*, *, surface}, {illumination_off, surface}}
```

These values can indicate, respectively, that if the recycle action occurs during daylight at a shallow depth (e.g., above 1 meter or above 2 meters), the light can be recycled rapidly (e.g., 1 minute duration or 2 minute duration); if the recycle action occurs at medium depth (e.g., 1 to 3 meters) day or night, the illumination should not change; if the recycle occurs at a deep depth (e.g., 3 to 6 meters) during daylight, the light can be recycled rapidly; if the recycle occurs at any time of day at a floor depth (e.g., below 6 meters or below 8 meters), the light should be recycled slowly (over 30 minutes or over 1 hour); and if the action is to bring the light to the surface, the light should be turned off immediately.

The system can determine a plan by matching the sensor value categories and the objectives to the entries in the data structure. The result of the match can be an indication of the objective (e.g., recycle or surface) and a corresponding action that limits the risk of startling the fish.

In another implementation, the system can use a trained classification machine learning model, such as a logistic regression model, to predict whether a proposed action will startle the fish. The machine learning model can use trained parameter values, as discussed above. The result of the machine learning model can be a value corresponding to the likelihood that the fish will be startled for a given proposed action. If the value is below a configured threshold, the system can determine that the fish will not be startled.

To determine which action(s) should be used to achieve an objective, the system can execute the machine learning model using the relevant parameters and possible actions associated with the objective. For example, if the depth is "shallow," the ambient light class is "low," and the objective is "recycle," possible actions can include "rapid_recycle" and "slow_recycle." The system can evaluate the machine learning model using the parameters "shallow," "low" and "rapid_recycle." The result with be a value that corresponds to the likelihood that the fish will be startled. If the value is below a configured threshold, the system can determine that the fish will not be startled and construct a plan that includes "rapid_recycle." Instead, if the value is above a configured threshold, the system can determine that the fish are likely to be startled for the action "rapid_recycle," and evaluate the model on a different set of parameters, such as "shallow," "low" and "slow_recycle." If no action is identified that has a value below the configured threshold, then the system can produce a "null" plan indication to indicate that no viable plan was found.

In some implementations, model evaluation engine can identify plans that accomplish a given objective using more complex device behaviors such as both moving the device and changing illumination levels. For example, by evaluating a model, the anti-fish-startling evaluation engine might determine that, at a deeper depth, such as below 6 meters, a relatively long period would be required to recycle a lighting device. However, if the device was first moved to a more shallow depth, for example, to 2 meters, the lighting device could be recycled more quickly without startling the fish. In this case, the anti-fish-startling evaluation engine can produce a plan to instructs the device to move from its current depth, such as 7 meters, closer to the surface, for example, to a depth of 2 meters, recycle the lights rapidly, then return to its original depth. As a result, the anti-fish-startling evaluation engine can accomplish an objective, such as changing lighting modes, without startling the fish, while minimizing the time to accomplish the objective.

In decision operation 360, the system determines whether a plan that satisfies the objectives was found. If a plan was found, the system proceeds to operation 370; if a plan was not found, the system proceeds to operation 380.

In operation 370, the system transmits the plan indicator to a target such as an aquaculture management device or to a device that manages an aquaculture management device. The transmission can use any protocol appropriate for transmitting information to a target. Upon completing the transmission, the system can return to operation 340 to determine subsequent objectives.

In operation 380, the system can transmit an error indicator. The error indicator can be transmitted to a device responsible for logging error messages, to an administrative console, to a person responsible for managing the system, to other computers or parties, or any combination thereof. Upon completing the transmission, the system can return to operation 340 to determine subsequent objectives.

While this specification has largely described a framework for controlling devices in the context of an aquaculture environment, other implementations can apply to other living creatures and to other environments.

In one such implementation a framework for controlling devices can be used in an agriculture setting. For example, the devices can include illumination devices and imaging devices designed to traverse fields in which horses graze, and the framework can be used to ensure that horses are not startled, as a startled horse can rear up and injure itself, other horses, or humans who are in the vicinity of the startled horse.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
    training an anti-fish-startling model evaluation engine to output actions for accomplishing objectives while reducing a startling effect on nearby fish using training data that includes, for different, previously performed actions, (i) one or more sensed conditions associated with performing the different actions in an aquaculture environment, (ii) objectives associated with the different actions, and (iii) indications of whether nearby fish were startled when the different actions were previously performed;
    determining a particular objective for a robot that is operating in the aquaculture environment;
    determining one or more particular sensed conditions that are associated with the aquaculture environment;
    providing the particular objective and the particular sensed conditions to the trained anti-fish-startling model evaluation engine;
    receiving, from the trained anti-fish-startling model evaluation engine, one or more particular actions for accomplishing the particular objective while reducing the startling effect on nearby fish; and
    transmitting the one or more particular actions to another device.

2. The method of claim 1, wherein the particular objective is illuminating an illumination device.

3. The method of claim 1, wherein the particular objective is moving the robot.

4. The method of claim 3, wherein the one or more particular actions comprise illuminating an illumination device over a configured period of time.

5. The method of claim 1, wherein the anti-fish-startling model evaluation engine evaluates an output of a machine learning model.

6. The method of claim 1, wherein determining the one or more particular actions includes evaluating one or more rules.

7. The method of claim 1, wherein the objective is introducing a device into the environment.

8. A non-transitory, computer-readable medium storing one or more instructions executable by a computer system to perform operations comprising:
    training an anti-fish-startling model evaluation engine to output actions for accomplishing objectives while reducing a startling effect on nearby fish using training data that includes, for different, previously performed actions, (i) one or more sensed conditions associated with performing the different actions in an aquaculture environment, (ii) objectives associated with the different actions, and (iii) indications of whether nearby fish were startled when the different actions were previously performed;
    determining a particular objective for a robot that is operating in the aquaculture environment;
    determining one or more particular sensed conditions that are associated with the aquaculture environment;
    providing the particular objective and the particular sensed conditions to the trained anti-fish-startling model evaluation engine;
    receiving, from the trained anti-fish-startling model evaluation engine, one or more particular actions for accomplishing the particular objective while reducing the startling effect on nearby fish; and
    transmitting the one or more particular actions to another device.

9. The non-transitory, computer-readable medium of claim 8, wherein the particular objective is illuminating an illumination device.

10. The non-transitory, computer-readable medium of claim 8, wherein the particular objective is moving the robot.

11. The non-transitory, computer-readable medium of claim 10, wherein the one or more particular actions comprise the action comprises illuminating an illumination device over a configured period of time.

12. The non-transitory, computer-readable medium of claim 8, wherein the anti-fish-startling model evaluation engine evaluates an output of a machine learning model.

13. The non-transitory, computer-readable medium of claim 8, wherein determining the one or more particular actions includes evaluating one or more rules.

14. The non-transitory, computer-readable medium of claim 8, wherein the objective is introducing a device into the environment.

15. A system comprising:
    one or more computers; and
    one or more non-transitory computer-readable media that store instructions that, when executed by the one or more computers, cause the one or more computers to perform operations comprising:

training an anti-fish-startling model evaluation engine to output actions for accomplishing objectives while reducing a startling effect on nearby fish using training data that includes, for different, previously performed actions, (i) one or more sensed conditions associated with performing the different actions in an aquaculture environment, (ii) objectives associated with the different actions, and (iii) indications of whether nearby fish were startled when the different actions were previously performed;

determining a particular objective for a robot that is operating in an in the aquaculture environment;

determining one or more particular sensed conditions that are associated with the aquaculture environment;

providing the particular objective and the particular sensed conditions to the trained anti-fish-startling model evaluation engine;

receiving, from the trained anti-fish-startling model evaluation engine, one or more particular actions for accomplishing the particular objective while reducing the startling effect on nearby fish; and transmitting the one or more particular actions to another device.

16. The computer-implemented system of claim 15, wherein the particular objective is illuminating an illumination device.

17. The computer-implemented system of claim 15, wherein the particular objective is moving the robot.

18. The computer-implemented system of claim 17, wherein the one or more particular actions comprise illuminating an illumination device over a configured period of time.

19. The computer-implemented system of claim 15, wherein the anti-fish-startling model evaluation engine evaluates an output of a machine learning model.

20. The computer-implemented system of claim 15, wherein determining the one or more particular actions includes evaluating one or more rules.

\* \* \* \* \*

UNITED STATES PATENT AND TRADEMARK OFFICE
CERTIFICATE OF CORRECTION

| | |
|---|---|
| PATENT NO. | : 12,077,263 B2 |
| APPLICATION NO. | : 17/347452 |
| DATED | : September 3, 2024 |
| INVENTOR(S) | : Andrew Rossignol et al. |

It is certified that error appears in the above-identified patent and that said Letters Patent is hereby corrected as shown below:

In the Claims

Column 14, Line 53, in Claim 11:
Before "illuminating" delete "the action comprises"

Column 15, Line 14, in Claim 15:
After "operating" delete "in an"

Signed and Sealed this
Fifteenth Day of October, 2024

Katherine Kelly Vidal
*Director of the United States Patent and Trademark Office*